United States Patent
Kuo (10) Patent No.: US 9,323,356 B2
(45) Date of Patent: Apr. 26, 2016

(54) PROJECTIVE CAPACITIVE STYLUS AND CONTROLLING METHOD THEREOF

(71) Applicant: Henghao Technology Co., Ltd., Pingjhen, Taoyuan County (TW)

(72) Inventor: Ming-Shan Kuo, Pingjhen (TW)

(73) Assignee: Henghao Technology Co., Ltd. (TW)

( * ) Notice: Subject to any disclaimer, the term of this patent is extended or adjusted under 35 U.S.C. 154(b) by 43 days.

(21) Appl. No.: 14/104,750

(22) Filed: Dec. 12, 2013

(65) Prior Publication Data

US 2015/0022487 A1  Jan. 22, 2015

(30) Foreign Application Priority Data

Jul. 17, 2013  (TW) .............................. 102125640 A (51) Int. Cl.
*G06F 3/0354* (2013.01)
*G06F 3/044* (2006.01)

(52) U.S. Cl.
CPC ............ *G06F 3/03545* (2013.01); *G06F 3/044* (2013.01)

(58) Field of Classification Search
CPC .............................. G06F 3/03545; G06F 3/044
See application file for complete search history.

(56) References Cited

U.S. PATENT DOCUMENTS

| | | | | |
|---|---|---|---|---|
| 4,670,751 A * | 6/1987 | Enokido | ................. | G06F 3/038 179/19.01 |
| 4,786,765 A * | 11/1988 | Yamanami et al. | ........ | 178/19.06 |
| 5,028,745 A * | 7/1991 | Yamanami | .............. | G06F 3/046 178/18.07 |
| 5,134,689 A * | 7/1992 | Murakami et al. | ............ | 345/443 |
| 5,565,632 A * | 10/1996 | Ogawa | ....................... | 73/862.69 |
| 5,619,431 A * | 4/1997 | Oda | ........................ | G06F 3/046 702/150 |
| 5,644,108 A * | 7/1997 | Katsurahira et al. | ....... | 178/18.07 |
| 5,729,251 A * | 3/1998 | Nakashima | ......... | G06F 3/03545 345/156 |
| 6,249,234 B1 * | 6/2001 | Ely et al. | ........................ | 341/20 |
| 6,784,876 B1 * | 8/2004 | Nagai et al. | .................... | 345/178 |
| 7,030,782 B2 * | 4/2006 | Ely et al. | .......................... | 341/20 |
| 2002/0070927 A1 * | 6/2002 | Fujitsuka | ............. | G01D 5/2006 345/179 |
| 2002/0190823 A1 * | 12/2002 | Yap | .................. | 335/205 |
| 2008/0158165 A1 * | 7/2008 | Geaghan et al. | ............. | 345/173 |
| 2010/0156818 A1 * | 6/2010 | Burrough et al. | ............. | 345/173 |
| 2011/0090146 A1 * | 4/2011 | Katsurahira | ........ | G06F 3/03545 345/156 |
| 2011/0193776 A1 * | 8/2011 | Oda et al. | ....................... | 345/157 |
| 2012/0062521 A1 * | 3/2012 | Ahn | ..................... | G06F 3/03545 345/179 |
| 2012/0068975 A1 * | 3/2012 | Wei et al. | ........................ | 345/179 |
| 2012/0113065 A1 * | 5/2012 | Chin | ............................. | 345/179 |
| 2014/0028635 A1 * | 1/2014 | Krah | ....................... | G06F 3/041 345/179 |
| 2014/0029182 A1 * | 1/2014 | Ashcraft | .................... | G06F 1/26 361/679.4 |
| 2014/0168175 A1 * | 6/2014 | Mercea et al. | ................. | 345/179 |

FOREIGN PATENT DOCUMENTS

| | | |
|---|---|---|
| TW | M413914 U1 | 10/2011 |
| TW | 201324252 | 12/2011 |

OTHER PUBLICATIONS

Office Action issued in corresponding Taiwanese Patent Application No. 102125640 on Dec. 19, 2014, consisting of 16 pp.

* cited by examiner

*Primary Examiner* — Claire X Pappas
*Assistant Examiner* — Robert Stone
(74) *Attorney, Agent, or Firm* — Volpe and Koenig, P.C.

(57) ABSTRACT

Configurations of a stylus and controlling methods thereof are disclosed. The proposed stylus causes a touch panel to generate a signal by an electrical field generated by a magnetic field via one of a conductor and an electric plate, wherein the stylus includes a set of windings and a magnet, which can move towards each other and generate a current on the set of windings through interaction. The current flows through the conductor/electric plate on a tip of the stylus to generate one of an electric flux line and a magnetic flux line such that the touch panel can sense the movement of the stylus.

5 Claims, 6 Drawing Sheets

PROJECTIVE CAPACITIVE STYLUS AND CONTROLLING METHOD THEREOF

CROSS-REFERENCES TO RELATED APPLICATIONS

This application claims the benefits of Taiwan Patent Application Number 102125640 filed on Jul. 17, 2013, at the Taiwan Intellectual Property Office, the disclosures of which are incorporated herein in their entirety by reference.

FIELD OF THE INVENTION

The present invention relates to a projective capacitive stylus and a controlling method thereof, in particular to a projective capacitive stylus used for a projective capacitive touch panel.

BACKGROUND OF THE INVENTION

According to the prior arts, a stylus is required to have a power supply, or an externally transmitted induced electrical field to supply energy such that the stylus could be operated after obtaining the energy, and this stylus can only be used in electromagnetic touch technology. In accordance with the aforementioned technology, if there is a power supply unit inside the stylus, regardless of the type of energy storage device, such as a rechargeable battery or a supercapacitor, used, it will need to be charged or replaced, which will cause a life-cycle problem. If it is a passive electromagnetic stylus, the host needs to release an electromagnetic field with high energy to allow the stylus to induce this energy in order to operate, and the power consumption of this method is higher than that of a stylus with an energy storage device.

Thus, a way to improve upon the existing technologies to make a stylus that does not depend on an internal power supply or an internal energy storage device is worthy of further research and improvement.

Keeping the drawbacks of the prior arts in mind, and by employing persistent and robust experiments and research, the applicant has finally conceived a projective capacitive stylus and a controlling method thereof.

SUMMARY OF THE INVENTION

It is therefore an objective of the present invention to provide a stylus that uses a magnetic field to generate an electric field so as to generate a signal to a touch panel via a conductor or a parallel electric field configured on a stylus tip; the stylus includes a set of windings and a magnet, both of which can be moved relative to each other such that a current can be generated on the set of windings via induction, and an electric flux line, or a magnetic flux line is released via the conductor or an electric plate configured on the stylus tip such that the touch panel can sense the motion of the stylus. The provided stylus does not need a built-in power supply or an externally induced power supply, can provide various touch motions including via a stylus tip-click manner and a push-button manner to achieve the same function of generating a current.

In accordance with the first aspect of the present invention, a projective capacitive stylus includes a magnet having a first terminal and a second terminal, a winding allowing an entrance and an exit of the first terminal of the magnet, wherein when an external force causes the magnet and the winding to generate a first relative motion, a first current is generated on the winding, a spring connected to the second terminal of the magnet, wherein when the external force is removed, the spring causes the magnet and the winding to generate a second relative motion and causes a second current to be generated on the winding, and one of a conductor and an electric plate, configured on a tip of the stylus and electrically connected to the winding, wherein when the first current and the second current are respectively generated, a first signal and a second signal are correspondingly generated on an external touch panel via the one of the conductor and the electric plate.

In accordance with the second aspect of the present invention, a projective capacitive stylus includes a magnet and a winding, wherein when the magnet and the winding generate a first relative motion, a first current is generated on the winding, when the magnet and the winding generate a second relative motion, a second current is generated on the winding, and the first current and the second current respectively cause an external touch panel to correspondingly generate a first signal and a second signal.

In accordance with the third aspect of the present invention, a projective capacitive stylus includes a magnet and a winding, wherein a relative motion direction of the magnet and the winding is changed by one of a push-button manner and a stylus-click manner to generate a respective one of a forward current and a reverse current so as to cause an external touch panel to correspondingly generate a respective one of a first signal and a second signal, which are used to determine various motions of the stylus.

In accordance with the fourth aspect of the present invention, a projective capacitive stylus includes a body, a magnet configured within the body, and a winding configured in the body and being in a relative motion with the magnet such that when the magnet induces the winding, the winding generates a current used to form a touch signal.

In accordance with the fifth aspect of the present invention, a projective capacitive stylus includes a magnet having a positive pole and a negative pole, and a winding, wherein the winding induces the positive pole and the negative pole to generate a forward current and a reverse current respectively, and a forward signal and a reverse signal are respectively generated on an external touch panel in response to the forward signal and the reverse signal.

In accordance with the sixth aspect of the present invention, a projective capacitive stylus includes one of a conductor and an electric plate, configured on a tip of the stylus, and a winding electrically connected to the one of the conductor and the electric plate, wherein the one of the conductor and the electric plate amplifies a conductor effect via the winding to generate a relatively strong touch signal.

In accordance with the seventh aspect of the present invention, a projective capacitive stylus includes a magnet and a winding, wherein the magnet induces the winding to cause the winding to generate a current to further influence a strength of a touch signal on an external touch panel.

In accordance with the eighth aspect of the present invention, a projective capacitive stylus apparatus includes a plurality of projective capacitive styluses, wherein when the plurality of projective capacitive styluses touch an external touch panel having an oscillator circuit, a plurality of signals are correspondingly generated via the oscillator circuit to support a multi-touch function.

In accordance with the ninth aspect of the present invention, a controlling method for a projective capacitive stylus includes steps of: providing a magnet and a winding; changing a motion direction of one of the magnet and the winding via one of a push-button manner and a stylus-click manner; in response to the changed motion direction, generating a forward current and a reverse current; in response to the forward current and the reverse current, correspondingly generating a forward signal and a reverse signal on an external touch panel; and using the forward signal and the reverse signal to determine various motions of the stylus.

In accordance with the tenth aspect of the present invention, a controlling method for a projective capacitive stylus includes steps of: providing one of a conductor and an electric plate, configured on a tip of the stylus, and a winding electrically connected to the one of the conductor and the electric plate; and causing the one of the conductor and the electric plate to amplify a conductor effect via the winding so as to generate a relatively strong touch signal.

In accordance with the eleventh aspect of the present invention, a controlling method for a projective capacitive stylus includes steps of: providing a magnet having a positive pole and a negative pole, and a winding; and causing the positive pole and the negative pole to induce the winding to respectively generate a forward current and a reverse current; and in response to the forward current and the reverse current, respectively generating a forward signal and a reverse signal on an external touch panel.

In accordance with the twelfth aspect of the present invention, a controlling method for a projective capacitive stylus includes steps of: providing a body, a magnet configured within the body and a winding configured within the body; causing the winding and the magnet to have a relative motion such that when the magnet induces the winding, a current is generated on the winding; and forming a touch signal on an external touch panel via the current.

In accordance with the thirteenth aspect of the present invention, a controlling method for a projective capacitive stylus includes steps of: providing a magnet and a winding; causing the magnet to induce the winding to generate a current; and causing the current to influence a strength of a touch signal on an external touch panel.

In accordance with the fourteenth aspect of the present invention, a controlling method for a projective capacitive stylus apparatus includes steps of: providing a plurality of projective capacitive styluses; causing the plurality of projective capacitive styluses to touch an external projective capacitive touch panel having an oscillator circuit; and in response to touches of the plurality of projective capacitive styluses, correspondingly generating a plurality of signals via the oscillator circuit to support a multi-touch function.

BRIEF DESCRIPTION OF THE DRAWINGS

Other objectives, advantages and efficacy of the present invention will be described in detail as follows, taken from the preferred embodiments with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise forms disclosed.

The present invention discloses a stylus applied to the driving element or the sensing element of a capacitive touch system. Different from a conventional stylus, which provides its functions via an energy storage device including a battery and a supercapacitor, the stylus proposed in the present invention achieves touch functions on a touch panel via an electric field generated by a magnetic field, and can accomplish various touch recognition functions through various currents generated by various magnetic fields. Various modifications and similar configurations involving an electric field generated by a magnetic field or similar to the following embodiments are within the scope of the present invention. The present invention achieves various touch functions at a significantly low cost and uses no power consumption to overcome the limitations of the prior arts.

Figure 1:
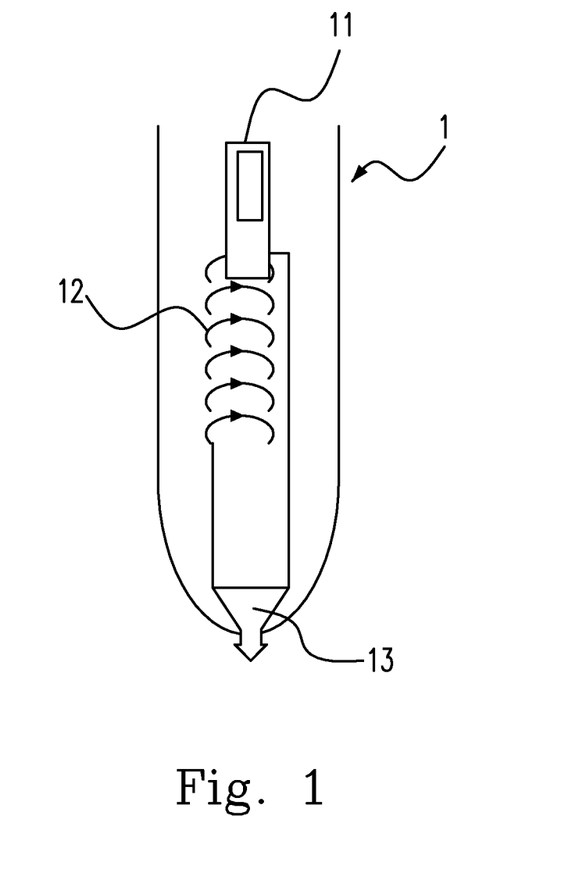
FIG. 1 is a schematic diagram of a projective capacitive stylus according to the first preferred embodiment of the present invention.

FIG. 1 shows a schematic diagram of a projective capacitive stylus according to the first preferred embodiment of the present invention. In FIG. 1, the projective capacitive stylus 1 includes a magnet 11, a winding 12 and a tip conductor 13. The magnet 11 and the winding 12 can be moved relative to each other, a current is generated on the winding 12 induced by a magnetic field generated by the magnet 11, and then an electric flux line, or a magnetic flux line is released via the tip conductor 13 (or an electrode) configured on the stylus tip such that an external touch panel (not shown) can sense a motion of the stylus.

In FIG. 1, when the tip of the stylus 1 is pressed, the tip conductor 13 moves inward to drive the winding 12 to approach one terminal of the magnet 11 so as to generate an induced potential and then a forward current is generated to induce the external touch panel (not shown) via the tip conductor 13 so as to generate a first touch sensing signal. And, when the projective capacitive stylus 1 is released from being pushed down, a spring (not shown) attached to the interior (e.g. at the top end) of the projective capacitive stylus 1 pushes the winding 12 back to the original position to generate an induced reversal potential at this moment, which causes a reverse current to be generated on the winding 12 to induce the external touch panel (not shown) via the tip conductor 13 to generate a second touch sensing signal.

Figure 2:
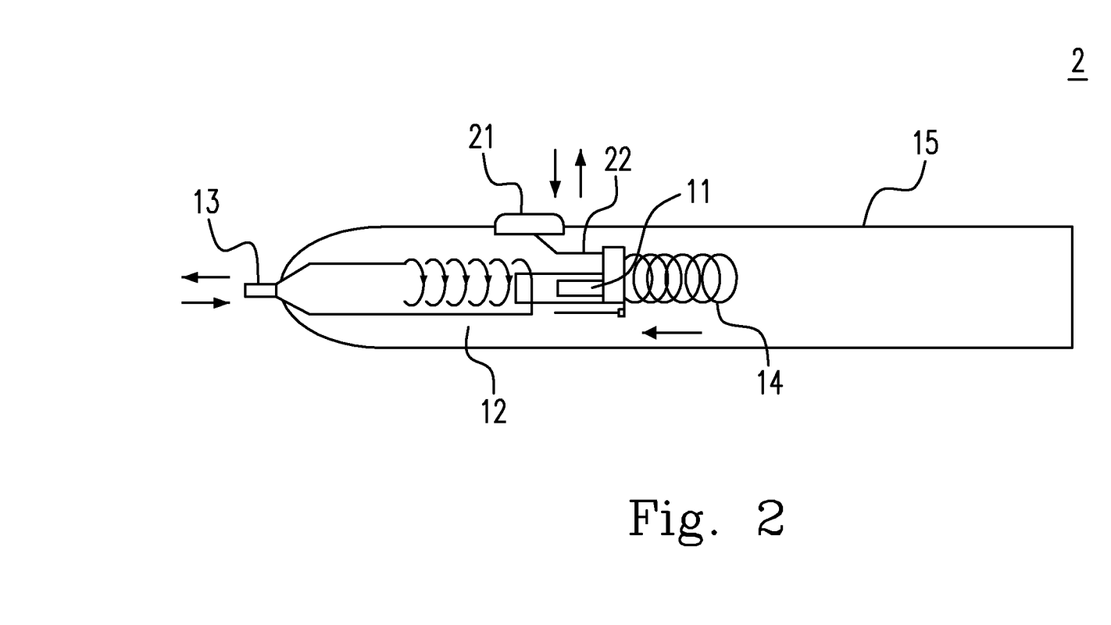
FIG. 2 is a schematic diagram of a projective capacitive stylus according to the second preferred embodiment of the present invention.
Figure 3A:
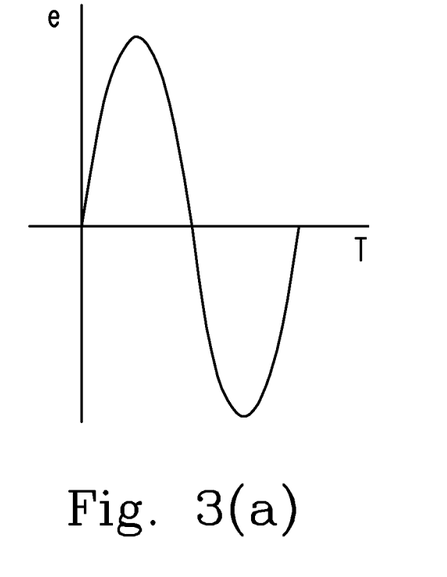
FIG. 3(a) shows a waveform diagram of a forward current induced by a forward magnetic field.
Figure 3B:
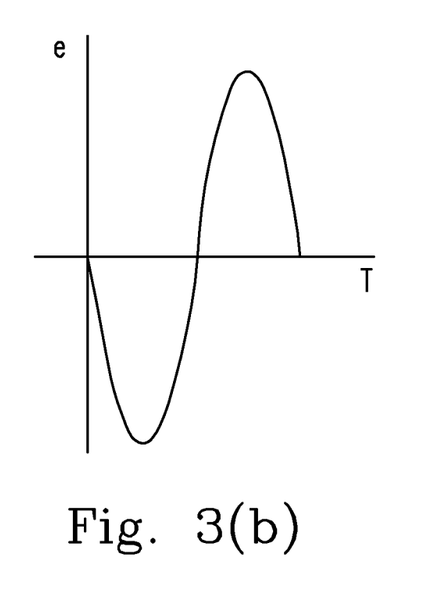
FIG. 3(b) shows a waveform diagram of a reverse current induced by a reverse magnetic field.

FIG. 2 shows a schematic diagram of a projective capacitive stylus according to the second preferred embodiment of the present invention. In FIG. 2, the projective capacitive stylus 2 includes a magnet 11, a winding 12, a tip conductor 13, a spring 14, a shell 15, a button 21 and a connecting rod 22. As mentioned above, when the tip of the stylus 2 is depressed, the tip conductor 13 moves inward to drive the winding 12 to approach one terminal of the magnet 11 so as to generate an induced potential, and then a forward current is generated to induce the external touch panel (not shown) via the tip conductor 13 to generate a first touch sensing signal. The direction of a forward current induced by this forward magnetic field is shown in FIG. 3(a). And, when the projective capacitive stylus 2 is released from being pushed down, the spring 14 attached to the interior (e.g. the top end) of the projective capacitive stylus 2 pushes the winding 12 back to the original position to generate an induced reversal potential at this moment, which causes a reverse current to be generated on the winding 12 to induce the external touch panel (not shown) via the tip conductor 13 to generate a second touch sensing signal. Also, when the tip conductor 13 is not moved inward and the button 21 is pushed down, the connecting rod 22 moves inward to drive the magnet 11 to depart from the winding 12 to generate an induced reversal potential, which causes a reverse current to be generated (as shown in FIG. 3(b)) to induce the external touch panel (not shown) via the tip conductor 13 to generate a first touch sensing signal. When the button 21 is released from being pushed down, the spring 14 pushes the magnet 11 back to the original position to generate an induced potential at this moment, and then a forward current (as shown in FIG. 3(a)) is generated on the winding 12 to induce the external touch panel (not shown) via the tip conductor 13 to generate a second touch sensing signal.

Figure 4A:
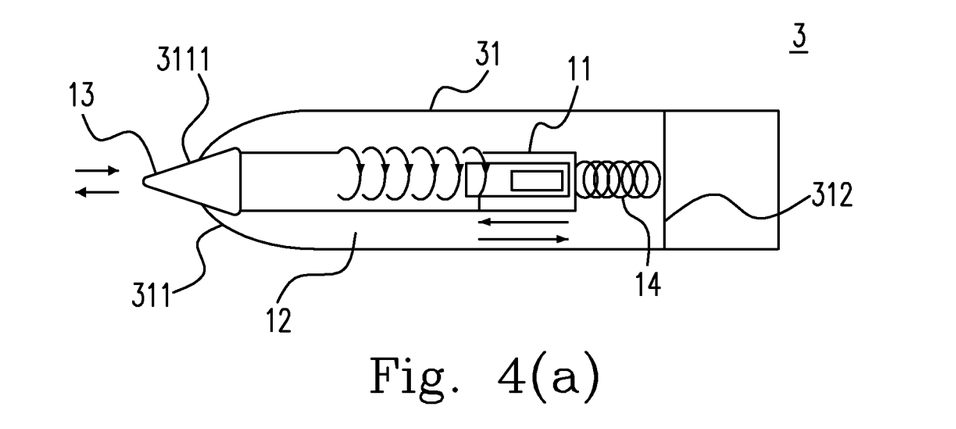
FIG. 4(a) is a schematic diagram of a projective capacitive stylus according to the third preferred embodiment of the present invention.
Figure 4B:
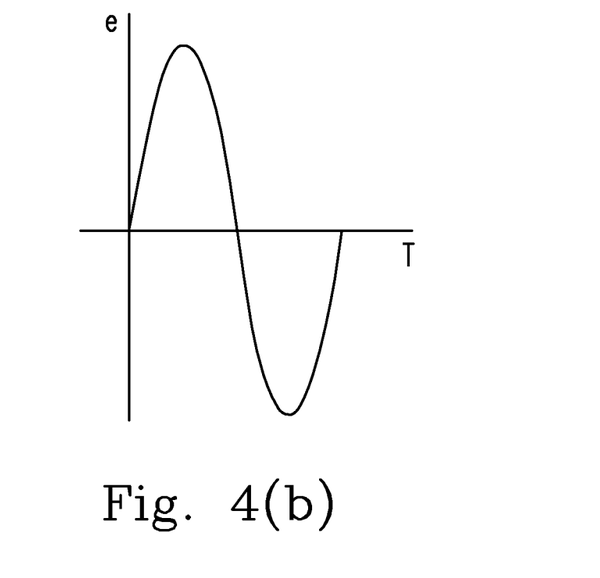
FIG. 4(b) shows the waveform diagram of the forward current induced by the forward magnetic field.

FIG. 4(a) shows a schematic diagram of a projective capacitive stylus according to the third preferred embodiment of the present invention. In FIG. 4(a), the projective capacitive stylus 3 includes a magnet 11, a winding 12, a tip conductor 13, a spring 14, a shell 31, a tip end 311, an opening 3111 and a top end 312. As shown in FIG. 4(a), the top end 312 connects to the spring 14. As mentioned above, when the tip of the stylus 3 is pressed, the tip conductor 13 moves inward to drive the winding 12 to approach one terminal of the magnet 11 to generate an induced potential, and then a forward current (as shown in FIG. 4(b)) is generated to induce the external touch panel (not shown) via the tip conductor 13 to generate a first touch sensing signal. And, when the projective capacitive stylus 3 is released from being pushed down, the spring 14 attached to the top end 312 of the projective capacitive stylus 3 pushes the winding 12 back to the original position to generate an induced reversal potential at this moment, which causes a reverse current (as shown in FIG. 3(b)) to be generated on the winding 12 to induce the external touch panel (not shown) via the tip conductor 13 to generate a second touch sensing signal.

Figure 5A:
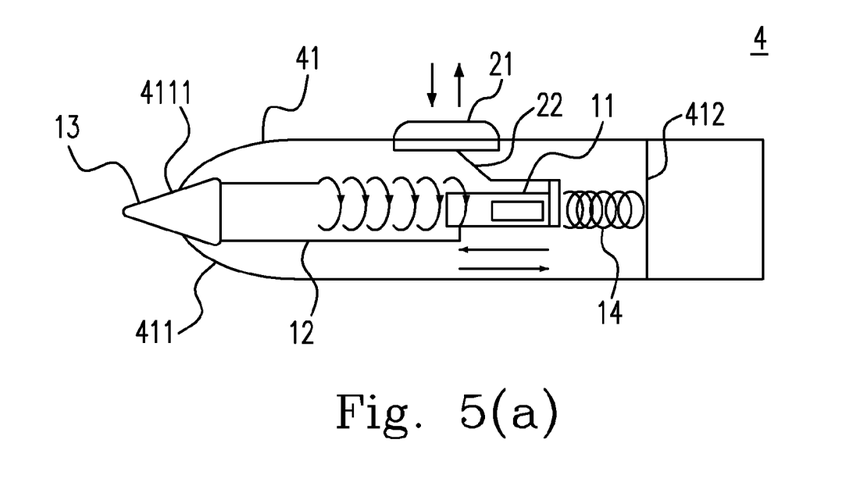
FIG. 5(a) is a schematic diagram of a projective capacitive stylus according to the fourth preferred embodiment of the present invention.
Figure 5B:
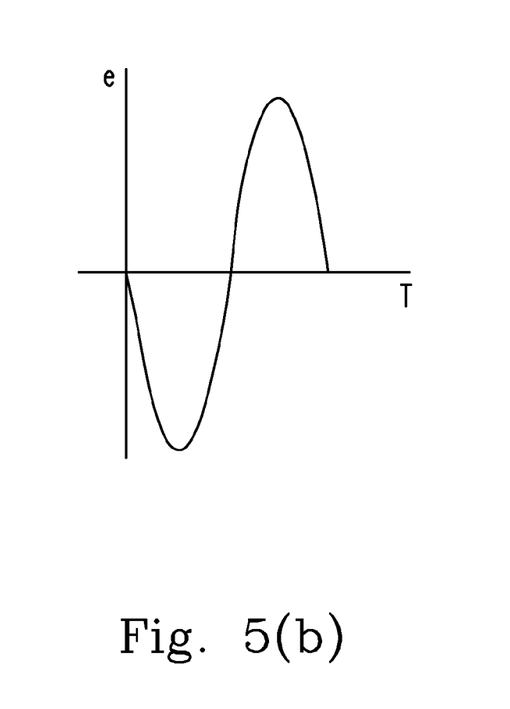
FIG. 5(b) shows the waveform diagram of the reverse current induced by the reverse magnetic field.

FIG. 5(a) shows a schematic diagram of a projective capacitive stylus according to the fourth preferred embodiment of the present invention. In FIG. 5(a), the projective capacitive stylus 4 includes a magnet 11, a winding 12, a tip conductor 13, a spring 14, a shell 41, a tip end 411, an opening 4111 and a top end 412. As shown in FIG. 5(a), the top end 412 is connected to the spring 14. As mentioned above, when the tip of the stylus 4 is depressed, the tip conductor 13 moves inward to drive the winding 12 to approach one terminal of the magnet 11 to generate an induced potential, and then a forward current (as shown in FIG. 3(a)) is generated to induce the external touch panel (not shown) via the tip conductor 13 to generate a first touch sensing signal. And, when the projective capacitive stylus 4 is released from being pushed down, the spring 14 attached to the top end 412 of the projective capacitive stylus 4 pushes the winding 12 back to the original position to generate an induced reversal potential at this moment, which causes a reverse current (as shown in FIG. 5(b)) to be generated on the winding 12 to induce the external touch panel (not shown) via the tip conductor 13 to generate a second touch sensing signal. The spring 14 is fixed to the top end 412 of the stylus 4, and the tip conductor 13 is a conductive tip connected to the winding 12 via a conducting wire. Under a general motion, the tip conductor 13 can be used to generate a touch function on an external touch panel (not shown). In this embodiment, when the button 21 is pushed down, the tip conductor 13 does not move, and the connecting rod 22 moves inward to drive the magnet 11 to depart from the winding 12, an induced reversal potential is generated, and then a reverse current (as shown in FIG. 5(b)) is generated to induce the external touch panel (not shown) via the tip conductor 13. When the button 21 is released from being pushed down, the spring 14 pushes the magnet 11 back to the original position to generate an induced potential at this moment and then a forward current on the winding 12 is generated to induce the external touch panel (not shown) via the tip conductor 13 to generate a second touch sensing signal.

Figure 6:
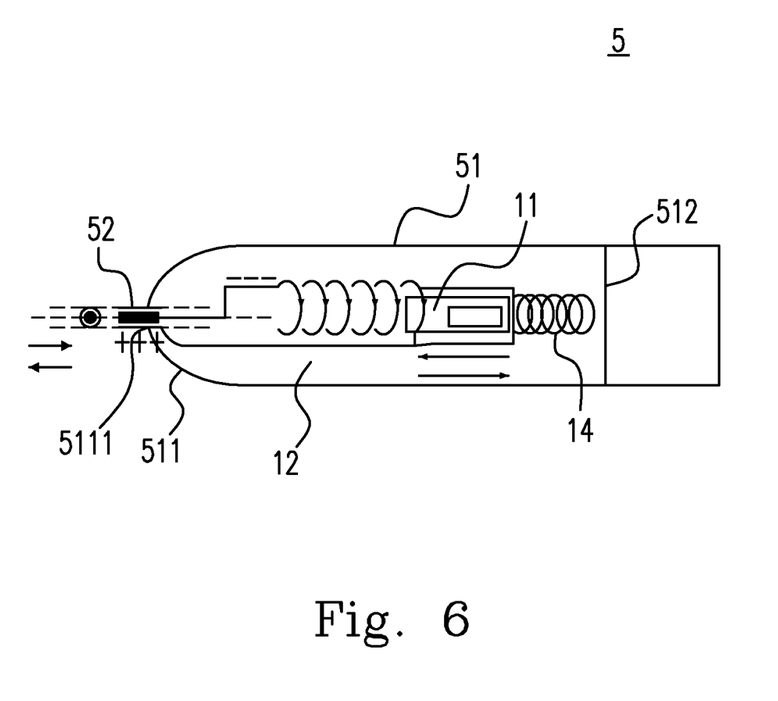
FIG. 6 is a schematic diagram of a projective capacitive stylus according to the fifth preferred embodiment of the present invention.

FIG. 6 shows a schematic diagram of a projective capacitive stylus according to the fifth preferred embodiment of the present invention. In FIG. 6, the projective capacitive stylus 5 includes a magnet 11, a winding 12, an electric plate 52, a spring 14, a body 51, a tip end 511, an opening 5111 and a top end 512. As shown in FIG. 6, the top end 512 connects to the spring 14. As mentioned above, when the tip of the stylus 5 is pushed down, the electric plate 52 moves inward to drive the winding 12 to approach one terminal of the magnet 11 to generate an induced potential, and then a forward current (as shown in FIG. 3(a)) is generated to induce the external touch panel (not shown) via the electric plate 52 to generate a first touch sensing signal. And, when the projective capacitive stylus 5 is released from being pushed down, the spring 14 attached to the top end 512 of the projective capacitive stylus 5 pushes the winding 12 back to the original position to generate an induced reversal potential at this moment, and then a reverse current (as shown in FIG. 3(b)) is generated on the winding 12 to induce the external touch panel (not shown) via the electric plate 52 to generate a second touch sensing signal. The spring 14 is fixed to the top end 512 of the stylus 5, and the electric plate 52 is a conductive plate connected to the winding 12 via a conducting wire. Under a general motion, the electric plate 52 can be used to generate a touch function on an external touch panel (not shown).

Embodiments

1. A projective capacitive stylus, comprising:
a magnet having a first terminal and a second terminal;
a winding allowing an entrance and an exit of the first terminal of the magnet, wherein when an external force causes the magnet and the winding to generate a first relative motion, a first current is generated on the winding;
a spring connected to the second terminal of the magnet, wherein when the external force is removed, the spring causes the magnet and the winding to generate a second relative motion and causes a second current to be generated on the winding; and
one of a conductor and an electric plate, configured on a tip of the stylus and electrically connected to the winding, wherein when the first current and the second current are respectively generated, a first signal and a second signal are correspondingly generated on an external touch panel via the one of the conductor and the electric plate.

2. A projective capacitive stylus according to Embodiment 1, further comprising a button, and a connecting rod connected to the button and the magnet, wherein when the button is pressed, the external force generated thereby causes the connecting rod to move inward to drive the first terminal of the magnet to depart from the winding so as to generate an induced reversal potential, which causes the second current to be generated on the winding; and when the button is released from being pushed-down, the external force is removed, causing the spring to push the magnet back to the original position to generate an induced potential at this moment, which in turn causes the first current to be generated on the winding.

3. A projective capacitive stylus according to Embodiment 1 or 2, further comprising a shell containing the magnet, the winding, the spring and the one of the conductor and the electric plate, wherein the shell has a tip end and a top end, the tip end has an opening allowing the one of the conductor and the electric plate to be exposed to contact the touch panel, and the spring is fixed to the top end.

4. A projective capacitive stylus according to any one of the above-mentioned Embodiments, wherein when the one of the conductor and the electric plate is pressed, the external force generated thereby causes the one of the conductor and the electric plate to move inward to drive the winding to approach the first terminal of the magnet so as to generate an induced potential, which causes the first current to be generated on the winding; and when the one of the conductor and the electric plate is released from being pushed down, the spring pushes the winding back to the original position to generate an induced reversal potential at this moment, which causes the second current to be generated on the winding, the first current is a forward current, and the second current is a reverse current.

5. A projective capacitive stylus, comprising:
a magnet; and
a winding, wherein when the magnet and the winding generate a first relative motion, a first current is generated on the winding, when the magnet and the winding generate a second relative motion, a second current is generated on the winding, and the first current and the second current respectively cause an external touch panel to correspondingly generate a first signal and a second signal.

6. A projective capacitive stylus, comprising:
a magnet; and
a winding, wherein a relative motion direction of the magnet and the winding is changed by one of a push-button manner and a stylus-click manner to generate a respective one of a forward current and a reverse current so as to cause an external touch panel to correspondingly generate a respective one of a first signal and a second signal, which are used to determine various motions of the stylus.

7. A projective capacitive stylus, comprising:
a body;
a magnet configured within the body; and
a winding configured within the body and being in a relative motion with the magnet such that when the magnet induces the winding, the winding generates a current used to form a touch signal.

8. A projective capacitive stylus, comprising:
a magnet having a positive pole and a negative pole; and
a winding, wherein when the winding induces the positive pole and the negative pole so as to generate a forward current and a reverse current respectively, a forward signal and a reverse signal are respectively generated on an external touch panel in response to the forward signal and the reverse signal.

9. A projective capacitive stylus, comprising:
one of a conductor and an electric plate, configured on a tip of the stylus; and
a winding electrically connected to the one of the conductor and the electric plate, wherein the one of the conductor and the electric plate amplifies a conductor effect via the winding to generate a relatively strong touch signal.

10. A projective capacitive stylus, comprising:
a magnet; and
a winding, wherein the magnet induces the winding to cause the winding to generate a current to further influence a strength of a touch signal on an external touch panel.

11. A projective capacitive stylus apparatus, comprising:
a plurality of projective capacitive styluses as disclosed in Embodiment 1,
wherein when the plurality of projective capacitive styluses touch an external touch panel having an oscillator circuit, a plurality of signals are correspondingly generated via the oscillator circuit to support a multi-touch function.

12. A controlling method for a projective capacitive stylus, comprising steps of:
providing a magnet and a winding;
changing a motion direction of one of the magnet and the winding via one of a push-button manner and a stylus-click manner;
in response to the changed motion direction, generating a forward current and a reverse current;
in response to the forward current and the reverse current, correspondingly generating a forward signal and a reverse signal on an external touch panel; and
using the forward signal and the reverse signal to determine various motions of the stylus.

13. A controlling method for a projective capacitive stylus, comprising steps of:
providing one of a conductor and an electric plate, configured on a tip of the stylus, and a winding electrically connected to the one of the conductor and the electric plate; and
causing the one of the conductor and the electric plate to amplify a conductor effect via the winding to generate a relatively strong touch signal.

14. A controlling method for a projective capacitive stylus, comprising steps of:
providing a magnet having a positive pole and a negative pole, and a winding; and
causing the positive pole and the negative pole to induce the winding to respectively generate a forward current and a reverse current; and
in response to the forward current and the reverse current, respectively generating a forward signal and a reverse signal on an external touch panel.

15. A controlling method for a projective capacitive stylus, comprising steps of:
providing a body, a magnet configured within the body and a winding configured within the body;
causing the winding and the magnet to have a relative motion such that when the magnet induces the winding, a current is generated on the winding; and
forming a touch signal on an external touch panel via the current.

16. A controlling method for a projective capacitive stylus, comprising steps of:
providing a magnet and a winding;
causing the magnet to induce the winding to generate a current; and
causing the current to influence a strength of a touch signal on an external touch panel.

17. A controlling method for a projective capacitive stylus apparatus, comprising steps of:
providing a plurality of projective capacitive styluses as disclosed in Embodiment 1;
causing the plurality of projective capacitive styluses to touch an external projective capacitive touch panel having an oscillator circuit; and in response to touches of the plurality of projective capacitive styluses, correspondingly generating a plurality of signals via the oscillator circuit to support a multi-touch function.

According to the aforementioned descriptions, the present invention discloses a stylus using a magnetic field to generate an electric field to generate a signal to a touch panel via a conductor or a parallel electric field configured on a stylus tip, the stylus includes a set of windings and a magnet, both of which can be moved relative to each other such that a current can be generated on the set of windings via induction, and an electric flux line, or a magnetic flux line is released via the conductor or an electric plate configured on the stylus tip such that the touch panel can sense the motion of the stylus. Because the provided stylus does not need a built-in power supply or an externally induced power supply, can provide various touch motions including via a stylus tip-click manner and a push-button manner to achieve the same function of generating a current, and thus has non-obviousness and novelty.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A projective capacitive stylus, comprising:
    a magnet having a first terminal and a second terminal;
    a winding allowing an entrance and an exit of the first terminal of the magnet, wherein when an external force causes the magnet and the winding to generate a first relative motion, a first current is generated on the winding;
    a spring connected to the second terminal of the magnet, wherein when the external force is removed, the spring causes the magnet and the winding to generate a second relative motion and causes a second current to be generated on the winding; and
    one of a conductor and an electric plate, configured on a tip of the stylus and electrically connected to the winding, wherein when the first current and the second current are respectively generated, a first signal and a second signal are correspondingly generated on an external touch panel via the one of the conductor and the electric plate;
    a button; and
    a connecting rod connected to the button and the magnet, wherein when the button is pressed, the external force generated thereby causes the connecting rod to move inward to drive the first terminal of the magnet to depart from the winding so as to generate a first induced reversal potential, which causes the second current to be generated on the winding; and when the button is released from being pushed down, the external force is removed, causing the spring to push the magnet back to a first original position to generate a first induced potential at this moment, which in turn causes the first current to be generated on the winding.

2. A projective capacitive stylus according to claim 1, further comprising a shell containing the magnet, the winding, the spring and the one of the conductor and the electric plate, wherein the shell has a tip end and a top end, the tip end has an opening allowing the one of the conductor and the electric plate to be exposed to contact the touch panel, and the spring is fixed to the top end.

3. A projective capacitive stylus according to claim 1, wherein when the one of the conductor and the electric plate is depressed, the external force generated thereby causes the one of the conductor and the electric plate to move inward to drive the winding to approach the first terminal of the magnet to generate a second induced potential, which causes the first current to be generated on the winding; and when the one of the conductor and the electric plate is released from being pushed down, the spring pushes the winding back to a second original position to generate a second induced reversal potential at this moment, which causes the second current to be generated on the winding, the first current is a forward current, and the second current is a reverse current.

4. A projective capacitive stylus apparatus, comprising:
    a plurality of projective capacitive styluses as claimed in claim 1,
    wherein when the plurality of projective capacitive styluses touch an external touch panel having an oscillator circuit, a plurality of signals are correspondingly generated via the oscillator circuit to support a multi-touch function.

5. A controlling method for a projective capacitive stylus apparatus, comprising steps of:
    providing a plurality of projective capacitive styluses as claimed in claim 1;
    causing the plurality of projective capacitive styluses to touch an external projective capacitive touch panel having an oscillator circuit; and
    in response to touches of the plurality of projective capacitive styluses, correspondingly generating a plurality of signals via the oscillator circuit to support a multi-touch function.

* * * * *